H. J. MORRIS.
PROTECTIVE DEVICE FOR GAS METERS.
APPLICATION FILED APR. 9, 1909.
932,162.
Patented Aug. 24, 1909.
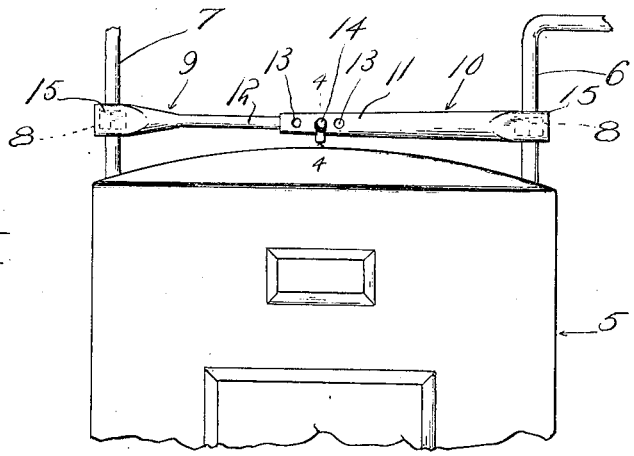
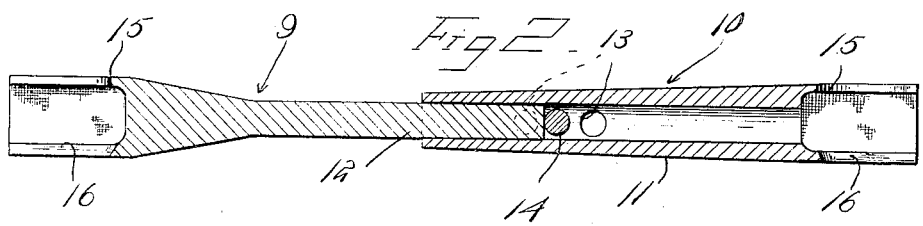
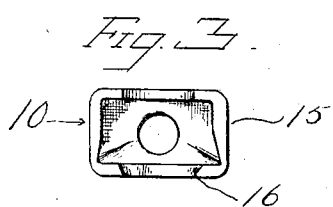
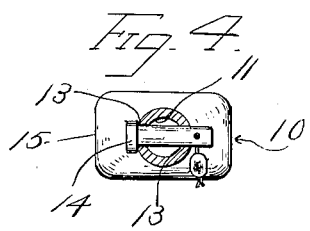
Inventor
Hilary J. Morris.
Witnesses
Attorneys

UNITED STATES PATENT OFFICE.

HILARY J. MORRIS, OF NEW BRITAIN, CONNECTICUT.

PROTECTIVE DEVICE FOR GAS-METERS.

932,162. Specification of Letters Patent. Patented Aug. 24, 1909.

Application filed April 9, 1909. Serial No. 488,873.

*To all whom it may concern:*

Be it known that I, HILARY J. MORRIS, a citizen of the United States, residing at New Britain, in the county of Hartford, State of Connecticut, have invented certain new and useful Improvements in Protective Devices for Gas-Meters; and I do hereby declare the following to be a full, clear, and exact description of the invention, such as will enable others skilled in the art to which it appertains to make and use the same.

The invention relates to a protective device for gas meters and more particularly to that class of devices for locking the coupling nuts connecting the pipes with the gas meter.

The primary object of the invention is the provision of a device of this character which will prevent the uncoupling of the meter from the supply pipe so that a malicious person may obtain gas without due registration in the meter and also to prevent the theft of the said meter.

Another object of the invention is the provision of a device of this character for preventing an unauthorized or malicious person or persons from tampering with the meter connections without breaking the device and indicating that the meter has been tampered with surreptitiously.

A still further object of the invention is the provision of a device of this character which is simple in construction thoroughly efficient in the operation and inexpensive in the manufacture.

With these and other objects in view the invention consists in the construction, combination and arrangement of parts as will be hereinafter more fully described, illustrated in the accompanying drawings and brought out in the claim hereunto appended.

In the drawings:—Figure 1 is a side view of a gas meter showing the supply pipes connected thereto in the usual manner with the protective or sealing device attached. Fig. 2 is a longitudinally sectional view through the device the same being detached from the meter and supply pipe. Fig. 3 is an end elevation of one of the sections of the device. Fig. 4 is a sectional view on the line 4—4 of Fig. 1.

Similar reference characters indicate corresponding parts throughout the several views in the drawings.

In the drawings the numeral 5 designates a gas meter of the usual and well known construction, and 6 is the inlet pipe, and 7 is the outlet pipe or supply pipe leading from the gas meter. The usual screw threaded couplings or nuts 8, are employed for connecting the pipe to the gas meter.

In order to overcome the possibility of a person or persons from tampering or disconnecting the meter from the supply pipe so as to obtain use of gas from the main without registering the same on the meter dial there is provided a protective device comprising sections 9 and 10, the latter being formed with a hollow stem 11, into which telescopes the solid stem 12, of the section 9, and contained in the hollow stem portion of the section 10 are diametrically opposed registering openings 13, arranged at intervals therein to receive a locking pin 14 against which the inner end of the stem 12 abuts when the sections have been adjusted to span a predetermined point. Each of said sections 9 and 10, respectively, is provided with a spanner or pocket 15, for snugly receiving and inclosing the nuts 8, or coupling devices for connecting the pipes 6 and 7 to the gas meter. The opposed inner side faces of the spanner heads 15, are beveled as at 16 so as to accommodate the swollen portions of the pipes at the points where the same have connection with the coupling. It will be obvious that the sections due to the telescoping of their stems will permit the adjustment of a protective device to permit its application to varying sizes of gas meters.

From the foregoing description the construction and operation of the device it is thought will be clearly apparent therefore a more extended explanation is deemed unnecessary and has been omitted.

What is claimed is:—

A device of the class described comprising sections, a hollow stem formed on one of said sections, a solid stem formed on the other of said sections and telescoping into the hollow stem, the said hollow stem containing at intervals transverse openings, a locking pin fitted in one of said openings and adapted to hold the sections in adjusted position, and spanner heads formed on the free ends of the said sections for inclosing the coupling nuts of a gas meter.

In testimony whereof, I affix my signature, in presence of two witnesses.

HILARY J. MORRIS.

Witnesses:
    FRANCES A. HATSING,
    M. D. BEADE.